US010371310B1

(12) United States Patent
Schulter (10) Patent No.: US 10,371,310 B1
(45) Date of Patent: Aug. 6, 2019

(54) QUICK RELEASE SUPPORT SYSTEM FOR A PORTABLE DEVICE

(71) Applicant: Michael Schulter, Spring, TX (US)

(72) Inventor: Michael Schulter, Spring, TX (US)

( * ) Notice: Subject to any disclaimer, the term of this patent is extended or adjusted under 35 U.S.C. 154(b) by 249 days.

(21) Appl. No.: 14/534,739

(22) Filed: Nov. 6, 2014

Related U.S. Application Data

(60) Provisional application No. 61/902,414, filed on Nov. 11, 2013.

(51) Int. Cl.
 *F16M 11/04* (2006.01)
(52) U.S. Cl.
 CPC ................... *F16M 11/041* (2013.01)
(58) Field of Classification Search
 CPC . B23P 11/00; H05K 5/004; E05D 7/06; B29L 2031/22; F16B 5/00; F16B 5/02; F16B 5/10; F16B 5/0642; F16B 21/00; F16M 13/00; F16M 11/14; F16M 11/04; F16M 11/041; Y10T 403/32631; Y10T 403/4694; Y10T 403/59; Y10T 403/591; Y10T 403/595; Y10T 403/7037; Y10T 403/7073; Y10T 403/7094; Y10T 403/76; Y10T 403/403; Y10T 24/45639; Y10T 24/45675; Y10T 24/45696; Y10T 403/593; E02F 3/3609; E02F 3/3613; E02F 3/364
 USPC ....... 292/342; 403/321; 348/375; 248/205.1, 248/177.1, 178.1, 179.1, 180.1, 181.2; 361/679.01, 679.02, 679.21, 679.26, 361/679.3
 See application file for complete search history.

(56) References Cited

U.S. PATENT DOCUMENTS

| 435,597 A | * | 9/1890 | Walder | E05C 3/30 |
| | | | | 292/124 |
| 2,856,661 A | * | 10/1958 | Holl | A44C 11/005 |
| | | | | 24/116 R |
| 3,177,547 A | * | 4/1965 | Wisniewski | A44B 11/2526 |
| | | | | 24/647 |
| 5,267,377 A | * | 12/1993 | Gillis | A44B 11/2511 |
| | | | | 24/633 |
| 5,850,954 A | * | 12/1998 | Dong-Joo | H04M 1/04 |
| | | | | 224/197 |
| 6,254,302 B1 | * | 7/2001 | Kraus | F16B 5/0628 |
| | | | | 248/221.12 |

(Continued)

FOREIGN PATENT DOCUMENTS

FR 2683239 A1 * 5/1993 ............. E02F 3/364

*Primary Examiner* — Matthieu F Setliff
(74) *Attorney, Agent, or Firm* — Jackson Walker, LLP (57) ABSTRACT

A quick release support system for a holder of a portable device includes a channel coupled to the holder, a clasp rotatably coupled to the channel and optionally biased to a closed position, and a mounting assembly configured to slide along the channel and be aligned with the clasp in an open position and engage with the clasp in a closed position. The channel can include a variable width opening to progressively align the mounting assembly as the mounting assembly slides along the channel and overarching wings over sides of the channel. Upon engagement with the clasp, the mounting assembly is constrained in all three orthogonal directions. The clasp can be pulled outward from the channel to release the mounting assembly, and the holder with the clasp can be disengaged from the mounting assembly and moved to another location, leaving the mounting assembly in a position for subsequent engagement.

21 Claims, 12 Drawing Sheets

(56) References Cited

U.S. PATENT DOCUMENTS

| | | | | |
|---|---|---|---|---|
| 6,508,080 | B1 * | 1/2003 | Ninomiya | A44C 5/2042 |
| | | | | 24/574.1 |
| 6,758,454 | B2 * | 7/2004 | Smed | F16M 11/10 |
| | | | | 248/278.1 |
| 6,840,487 | B2 * | 1/2005 | Carnevali | A47B 23/002 |
| | | | | 248/346.06 |
| D590,834 | S * | 4/2009 | Richter | D14/253 |
| D590,835 | S * | 4/2009 | Richter | D14/253 |
| D711,886 | S * | 8/2014 | Kerawala | D14/440 |
| D725,644 | S * | 3/2015 | Schulter | D14/253 |
| D725,645 | S * | 3/2015 | Schulter | D14/253 |
| 9,107,488 | B1 * | 8/2015 | Cordes | F16M 11/041 |
| 2003/0204941 | A1 * | 11/2003 | Liu | A44B 11/2511 |
| | | | | 24/636 |
| 2008/0023606 | A1 * | 1/2008 | Kalis | B60R 11/0258 |
| | | | | 248/288.31 |
| 2008/0061197 | A1 * | 3/2008 | Carnevali | F16M 11/14 |
| | | | | 248/181.1 |
| 2009/0127411 | A1 * | 5/2009 | Aguilar | B60R 11/02 |
| | | | | 248/205.8 |
| 2009/0205167 | A1 * | 8/2009 | Easley | B29C 45/14336 |
| | | | | 16/224 |
| 2011/0223802 | A1 * | 9/2011 | Zeller | B60R 16/027 |
| | | | | 439/529 |
| 2012/0099849 | A1 * | 4/2012 | Onishi | B60R 11/04 |
| | | | | 396/419 |
| 2013/0083507 | A1 * | 4/2013 | Guirlinger | F16M 13/00 |
| | | | | 361/809 |
| 2013/0094127 | A1 * | 4/2013 | Lu | F16M 11/041 |
| | | | | 361/679.01 |

* cited by examiner

QUICK RELEASE SUPPORT SYSTEM FOR A PORTABLE DEVICE

CROSS REFERENCE TO RELATED APPLICATIONS

This application claims the benefit of U.S. Provisional Appl. No. 61/902,414, filed Nov. 11, 2013, entitled "Quick Release Support System And Support For A Portable Device."

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure relates generally to support systems. More specifically, the disclosure relates to a quick release support system for connectable and disconnectable portable devices.

Description of the Related Art

Detachable systems for electronic and other portable devices frequently allow users to support the portable devices in a fixed location. These detachable systems often are docking stations that include communication means and powering means for use with portable devices that are electronic and can be simply pulled by hand pressure from the docking station when needed. Other support systems have no communication means or powering means but are held to a supporting surface by suction, adhesives, or mechanical attachment. In some systems, the support is typically a "permanent" affixation and can provide stability for the device. In other systems, the support is temporary and often is lacking in rigidity, especially in harsh or unstable environments. In some temporary support systems, release structures are activated to release the portable device, but can be difficult to align and reengage upon return.

There remains a need for an improved support system and method for portable devices that provides quick and easy release and yet provides stable support.

BRIEF SUMMARY OF THE INVENTION

A quick release support system for a holder of a portable device includes a channel coupled to the holder; a clasp rotatably coupled to the channel, the clasp being optionally biased to a closed position; and a mounting assembly configured to slide along the channel and be aligned with the clasp in an open position and engage with the clasp in a closed position. The channel can include a variable width opening to progressively align the mounting assembly as the mounting assembly slides along the channel. As the mounting assembly slides along the channel, a portion of the channel is sized to constrain the mounting assembly in a sideways first direction. The channel further includes an overarching wing over the channel on both sides of the channel under which the mounting assembly can be constrained to the channel in at least an outward second direction. Upon engagement with the clasp, the mounting assembly is constrained in a longitudinal third direction, so that the mounting assembly is constrained in all three orthogonal directions in the X-Y-Z axes. The clasp can be pulled outward from the channel to release the mounting assembly, and the holder with the clasp can be disengaged from the mounting assembly and moved to another location, leaving the mounting assembly in a position for subsequent engagement.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, elements have been labeled with alphabetical suffixes ("A", "B", and so forth) to designate various similar aspects of the system or device. When referring generally to such elements, the number without the letter may be used. Further, such designations do not limit the number of elements that can be used for that function.

A quick release support system for a holder of a portable device includes a channel coupled to the holder, a clasp rotatably coupled to the channel and optionally biased to a closed position, and a mounting assembly configured to slide along the channel and be aligned with the clasp in an open position and engage with the clasp in a closed position. The channel can include a variable width opening to progressively align the mounting assembly as the mounting assembly slides along the channel and overarching wings over sides of the channel. Upon engagement with the clasp, the mounting assembly is constrained in all three orthogonal directions. The clasp can be pulled outward from the channel to release the mounting assembly, and the holder with the clasp can be disengaged from the mounting assembly and removed to another location, leaving the mounting assembly in a position for subsequent engagement.

Figure 1:
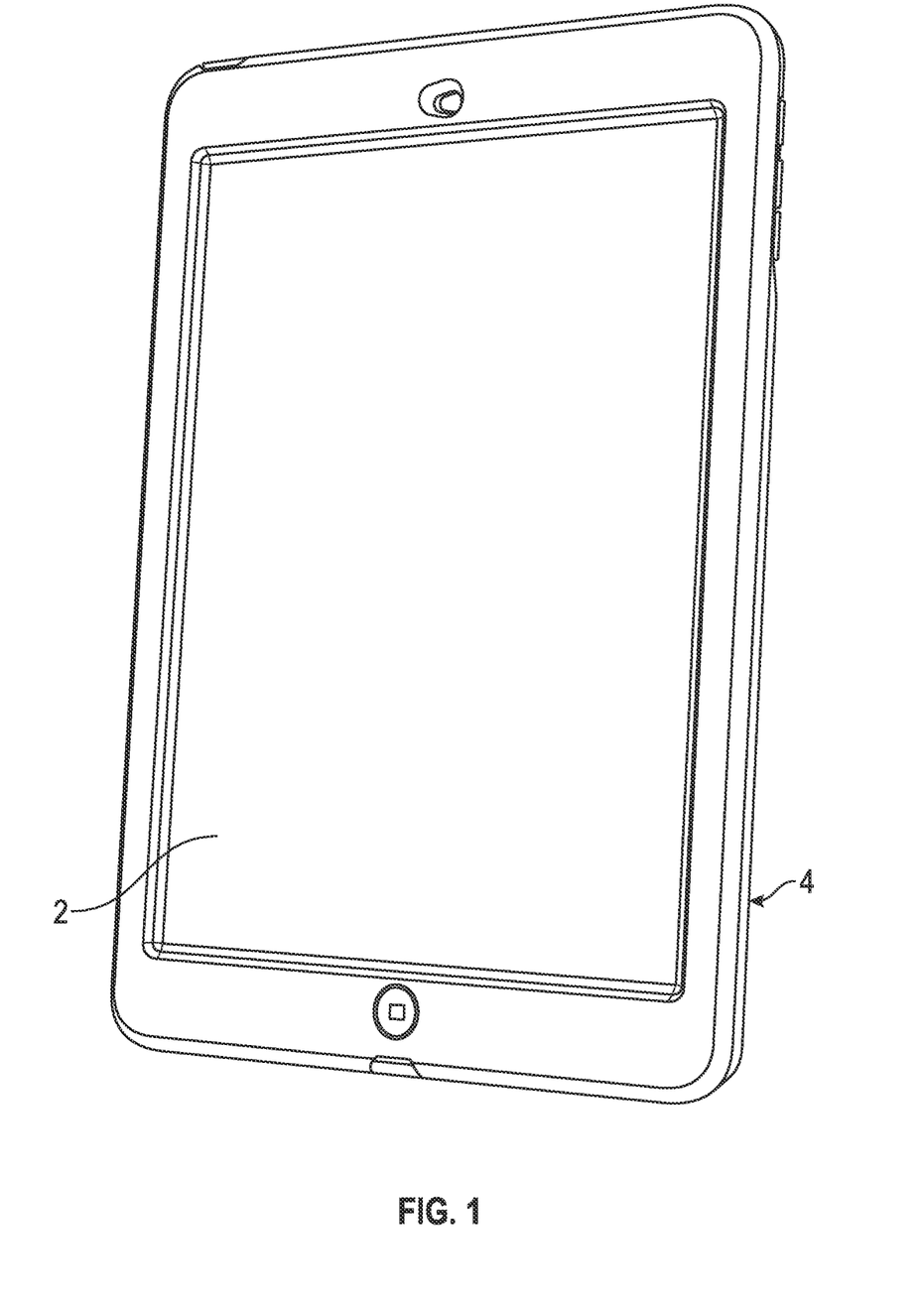
FIG. 1 is a perspective front schematic view of an exemplary embodiment of the quick release support system coupled to a portable device.
Figure 2:
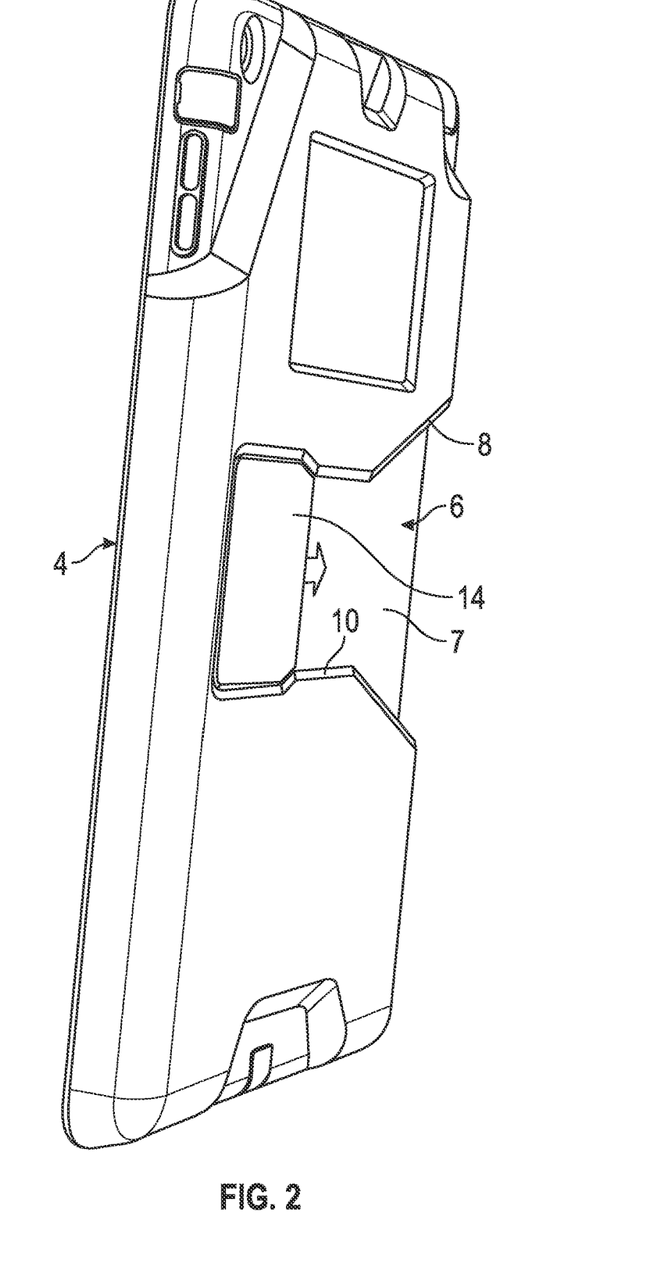
FIG. 2 is a perspective rear schematic view of the quick release support system.
Figure 3:
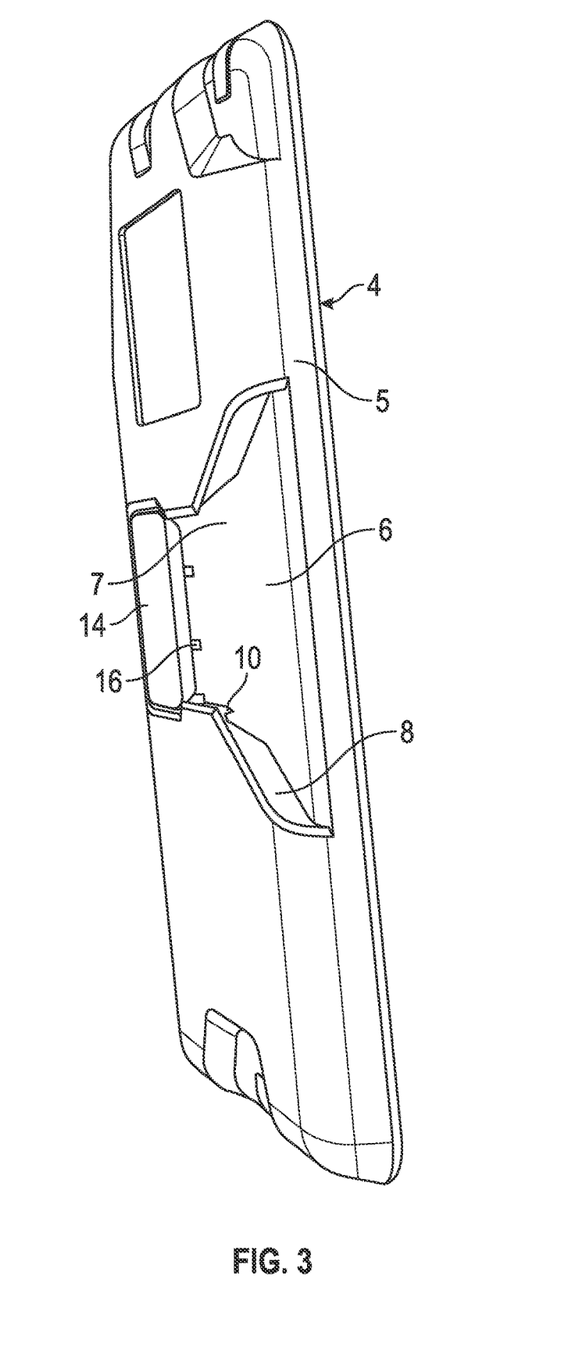
FIG. 3 is a perspective rear schematic view of the quick release support system from an opposite side of FIG. 2.
Figure 4:
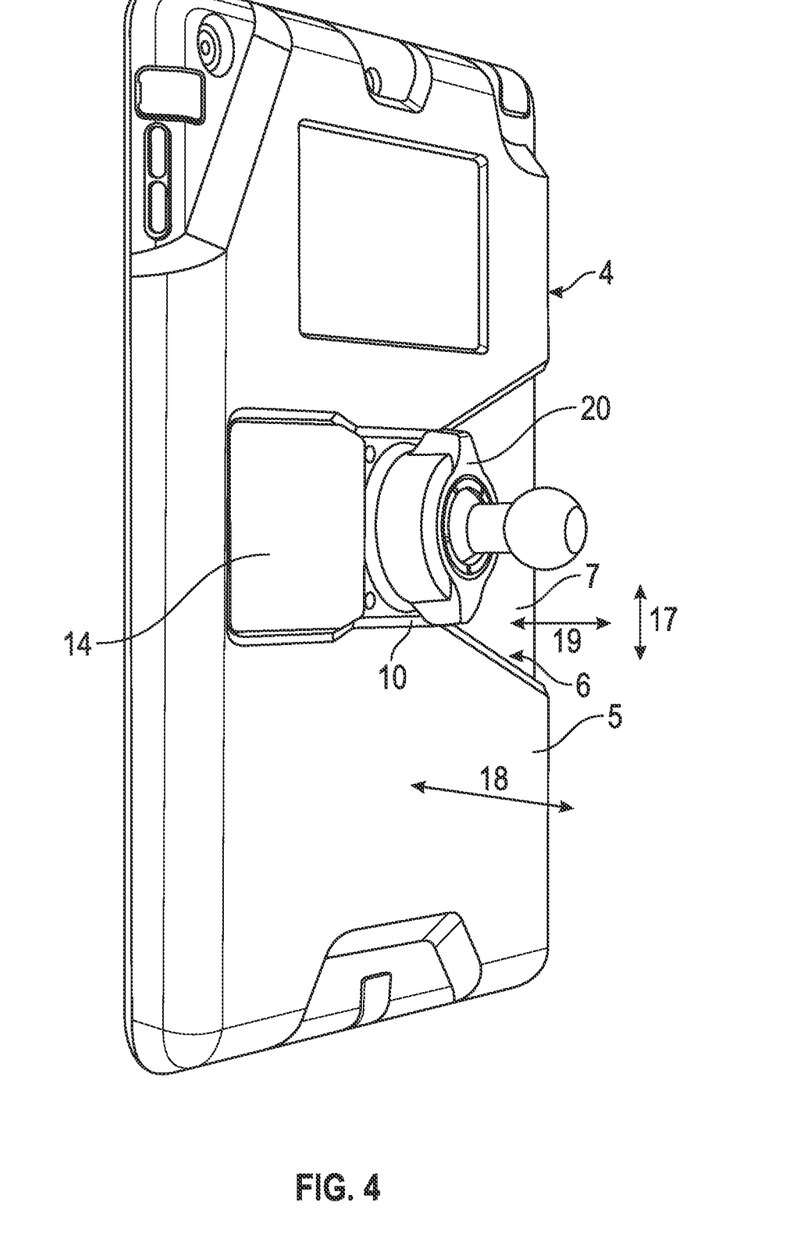
FIG. 4 is a perspective rear schematic view of the quick release support system with a mounting assembly coupled with a clasp in a channel.

FIG. 1 is a perspective front schematic view of an exemplary embodiment of the quick release support system coupled to a portable device. FIG. 2 is a perspective rear schematic view of the quick release support system. FIG. 3 is a perspective rear schematic view of the quick release support system from an opposite side of FIG. 2. FIG. 4 is a perspective rear schematic view of the quick release support system with a mounting assembly coupled with a clasp in a channel. The figures will be described in conjunction with each other. An exemplary portable device 2 can be coupled with a holder 5. The overall design of the holder 5 is generally unimportant for present purposes, and can be formed into various shapes, sizes, and configurations suitable to the particular portable device. The quick release support system 4 can be coupled, as defined herein, with the holder 5. In some embodiments, portions of the quick release support system 4, such as a channel, can be integrally formed with the holder 5, and other components of the quick release support system can be rotatably coupled and/or releasably coupled with the holder, as described herein.

The quick release support system 4 also includes a channel 6 through which a mounting assembly 20 can be coupled to a clasp 14. The channel 6 can be formed integrally with the holder 5 or attached to an existing holder. The channel 6 can be coupled with the holder in any suitable position, such as on a back of holder opposite the viewing screen, depending on the accessibility, primary orientation of the portable device during use, size, and other factors, as would be known by those in the art having the guidance of the present teaching of this invention. The channel 6 can include an opening 8, such as a variable width opening, to help facilitate alignment and eventual correct engagement of a mounting assembly 20. As the opening 8 of the channel 6 becomes narrower, the mounting assembly 20 is restricted in a sideways first direction 17. A wing 10 on each side of the opening 8 can overarch the opening above a bottom surface 7 of the channel to partially enclose a portion of a mounting assembly 20 slidably engaged therein and restrict the movement of the mounting assembly in an outward second direction 18 away from the channel (such as upwardly and out of the channel). The clasp 14 can be coupled to the holder 4 toward an end of the channel 6 and can be rotatably manipulated or otherwise lifted (or alternatively depressed) relative to the channel surface 7 to allow engagement with the mounting assembly 20. The clasp 14 can be optionally biased to a closed position. The clasp 14 can include protuberances 16 that can extend toward the channel surface 7 under the clasp. The protuberances 16 can be used to engage the mounting assembly 20 and secure the mounting assembly 20 into position in a longitudinal third direction 19. The mounting assembly 20 can have corresponding openings and/or ridges that the protuberances 16 of the clasp 14 can engage to secure the mounting assembly with the clasp. Once in place, the clasp 14 can be closed over the mounting assembly 20 to secure the mounting assembly from disengagement with the clasp. Thus, when the clasp 14 is closed on the mounting assembly 20, the mounting assembly is secured in three orthogonal directions: from side-to-side movement when enclosed by the side walls of the opening 8 of the channel 6; from moving away from the channel surface by the wings 10 of the opening 8; and from sliding out of the opening 8 by the clasp engaging the mounting assembly. The quick release support system 4 also includes aspects of the invention for securing a support from a table, window, or other surface, described below, to a backside (or other portions) of the system.

Figure 5:
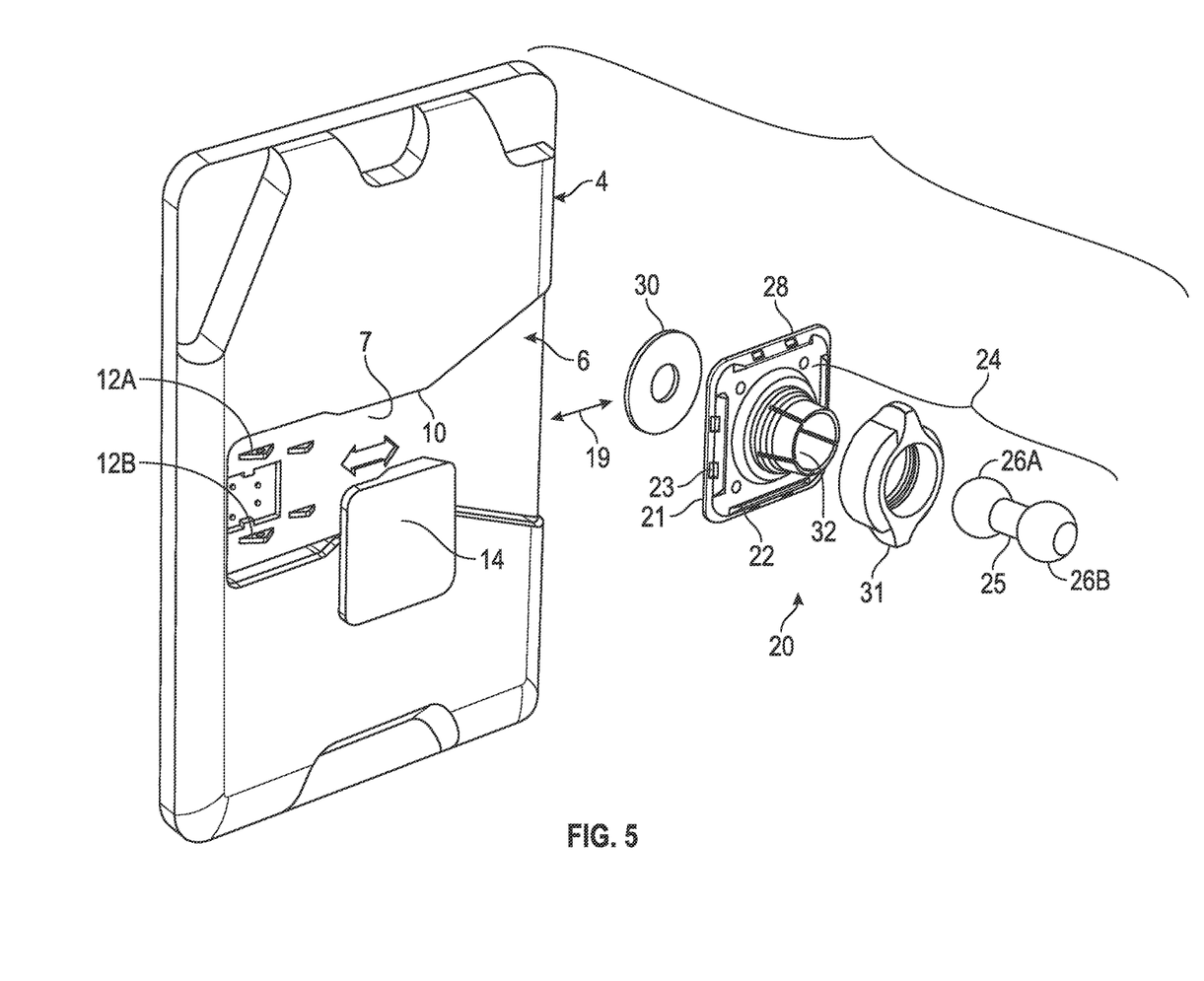
FIG. 5 is a perspective rear schematic assembly view of the quick release support system.

FIG. 5 is a perspective rear schematic assembly view of the quick release support system. The system 4 includes the clasp 14 coupled to the holder 5 with a detachable mounting assembly 20 slidably coupled with the clasp in a channel 6. The clasp 14 can be rotatably coupled with the holder 5 with one or more supports 12, such as supports 12A and 12B. The support can be engaged with the clasp and allow the clasp to rotate or "rock" toward the channel surface 7 or away from the channel surface, as the clasp is actuated to engage and disengage the mounting assembly 20. Edges 28 of the mounting assembly 20 can be entrapped under the wings 10 in the opening 8 of the channel, when the mounting assembly is slid under the wings.

Figure 11:
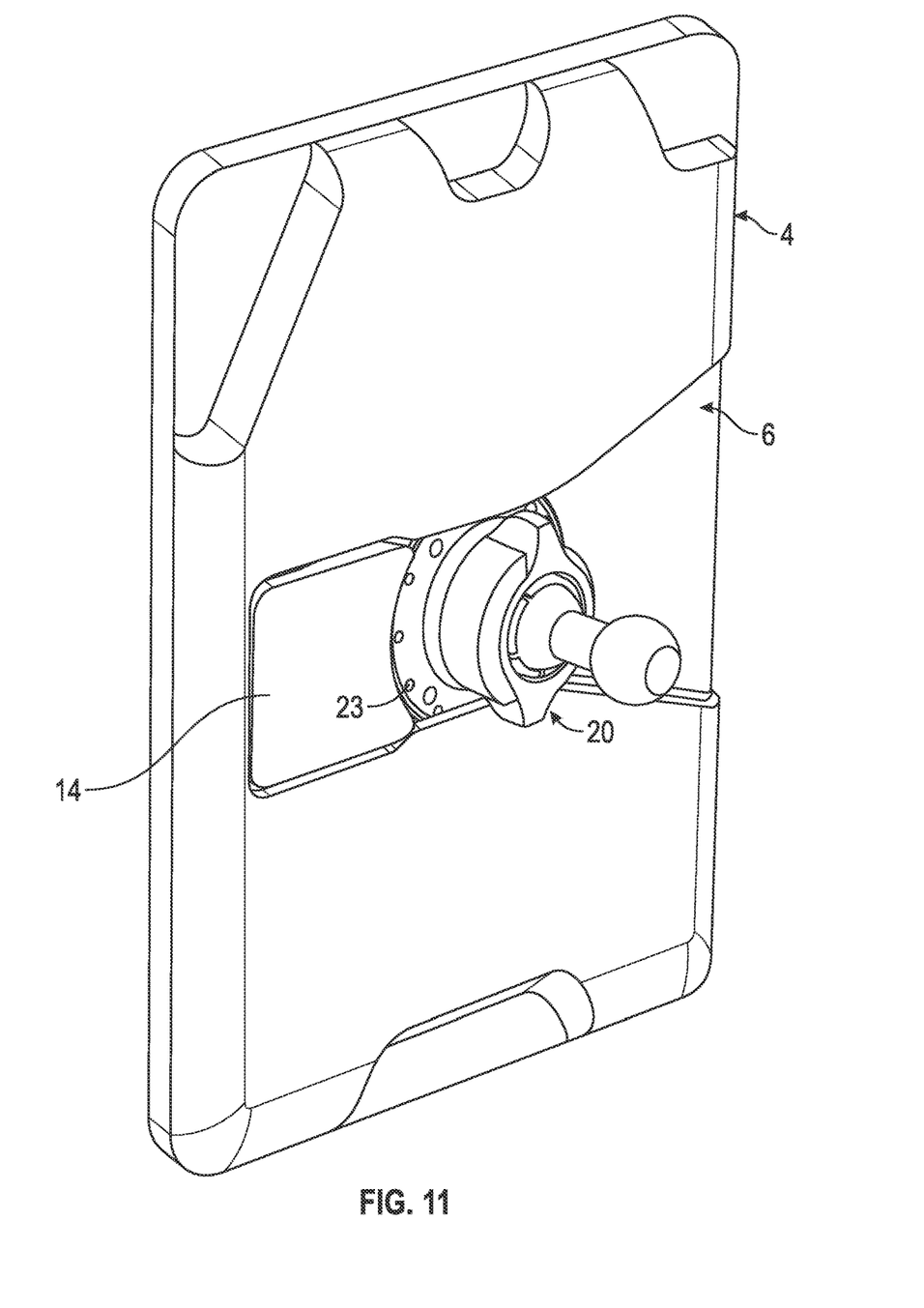
FIG. 11 is a perspective rear schematic view of another exemplary embodiment of the quick release support system.
Figure 12:
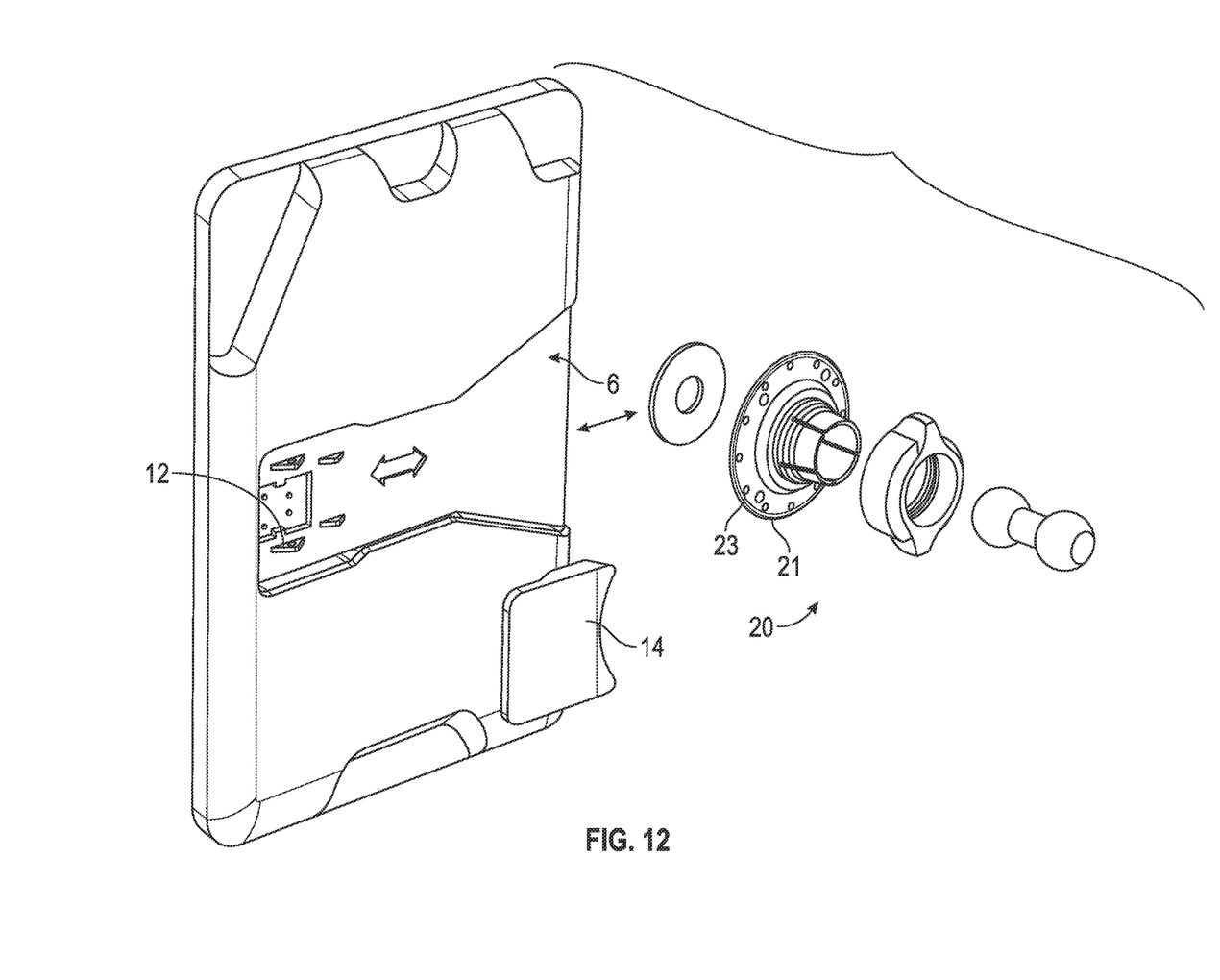
FIG. 12 is a perspective rear schematic assembly view of the quick release support system of FIG. 11.

The mounting assembly 20 can include a mounting plate 21. The mounting plate 21 can be any suitable shape and size. An exemplary shape for the mounting plate 21 is rectangular (broadly defined including square, as shown, rhomboid, and trapezoid). An alternative shape is round (broadly defined, including elliptical), as shown in FIGS. 11 and 12. In some embodiments, one or more protuberances 22, such as ridges or lugs, can be formed or otherwise coupled with the mounting plate 21. In other embodiments, one or more openings 23, such as indentions partially through the mounting plate 21 or holes through the mounting plate, can be formed in the mounting plate. In other embodiments, a combination of protuberances and openings can be used. The protuberances and/or openings can be used to secure the mounting assembly with the clasp 14. The mounting assembly 20 can further include a ball and socket assembly 24. The ball and socket assembly 24 can include a ball 26A (generally, ball "26") rotatably coupled into a ball socket 32 on the mounting plate 21. A nut 31 can secure the ball 26A with the ball socket 32 and tighten the ball in the ball socket to restrict rotational and lateral movement of the ball. The ball and socket assembly 24 can allow the ball 26A to be rotated into a variety of positions for suitable arrangement by a user. The ball 26A can be coupled with stud 25 that in turn is coupled with a second ball 26B, and the combination can be integrally formed. The second ball 26B can be used to couple a support structure with the holder and ultimately the portable device coupled therewith. A spacer 30 can be coupled with the mounting assembly 20 to assist the mounting assembly in sliding along the channel 6.

FIG. 6 through FIG. 9 illustrates an exemplary series of steps in engaging and disengaging the mounting assembly in the channel with the clasp.

Figure 6:
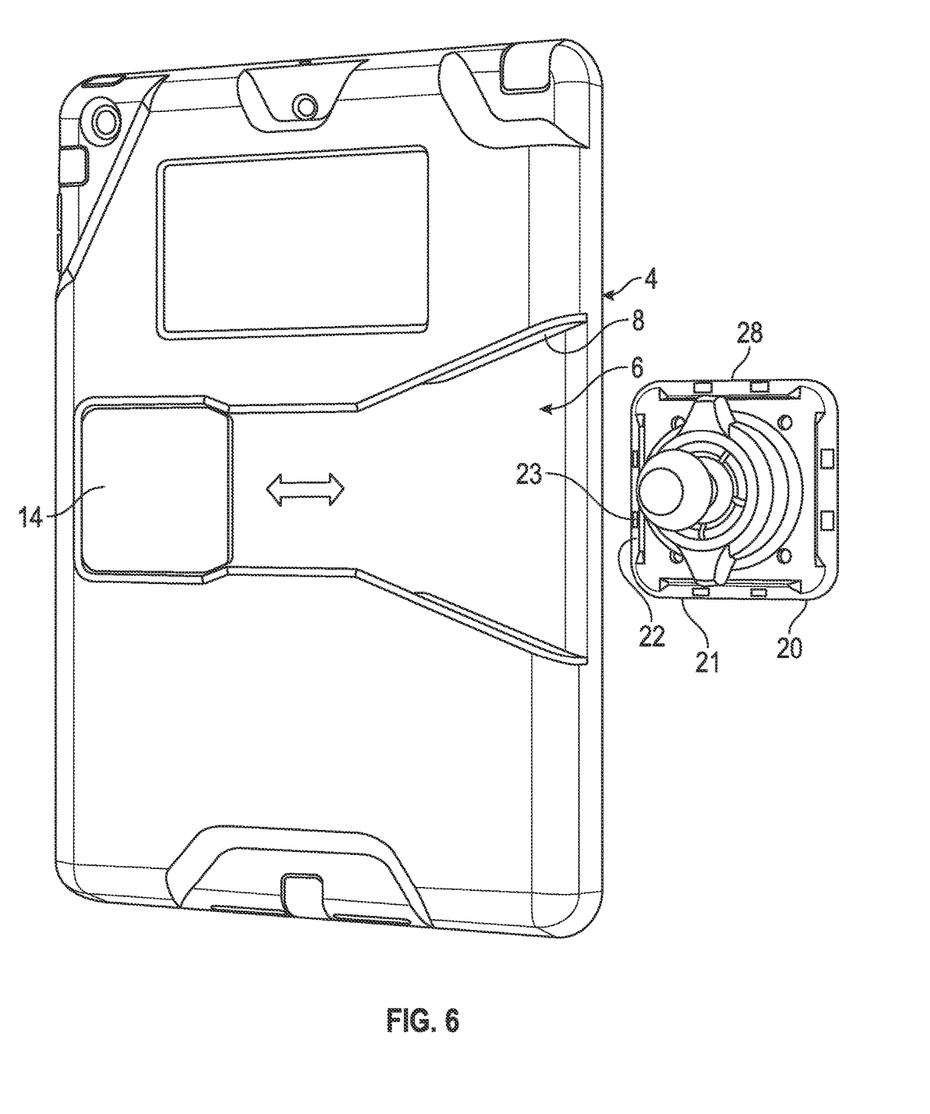
FIG. 6 is a perspective rear schematic view of the quick release support system including a channel, clasp, and mounting assembly disengaged from the channel and clasp.

FIG. 6 is a perspective rear schematic view of the quick release support system including a channel, clasp, and a mounting assembly disengaged from the channel and clasp. The mounting plate 21 of the mounting assembly 20 can be generally aligned orthogonally with the opening 8 in the channel 6. As seen in FIG. 6, the variable width opening 8 of the channel 6 is sized sufficiently wide to allow the mounting plate 21 to be inserted into the variable width opening at a plurality of locations along the channel. Advantageously, the variable width of the opening 8 can facilitate a proper lateral alignment of the mounting plate 21 with the clasp. Further, the variable width of the opening 8 can rotationally align the mounting plate into proper rotational alignment for coupling with the clasp. The variable width of the opening 8 can facilitate a "blind" alignment, so that the mounting assembly is progressively aligned with the clasp even without visual access to the channel.

Figure 7:
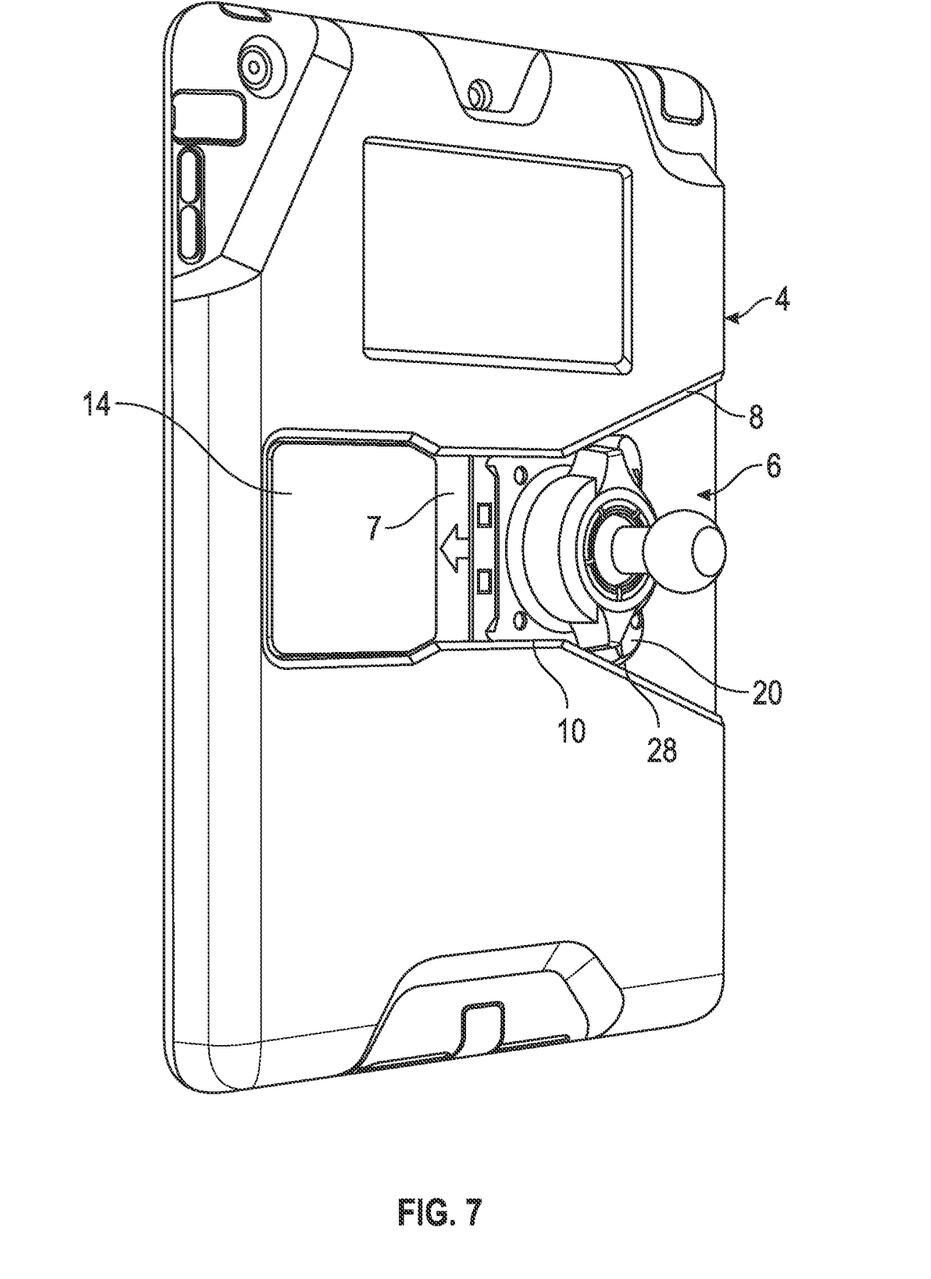
FIG. 7 is a perspective rear schematic view of the quick release support system with the mounting assembly engaged with the channel and disengaged from the clasp.

FIG. 7 is a perspective rear schematic view of the quick release support system with the mounting assembly engaged with the channel and disengaged from the clasp. As the mounting assembly 20 has been moved toward the clasp, the mounting plate 21 has become aligned and the edges 28 can be slid under the wings 10 in the opening 8 of the channel. As the mounting assembly 20 approaches the clasp 14, the clasp can be moved away from the bottom surface 7 of the channel, such as by pressing or lifting the clasp on one end, to allow clearance for the mounting plate 21 under the clasp.

Figure 8:
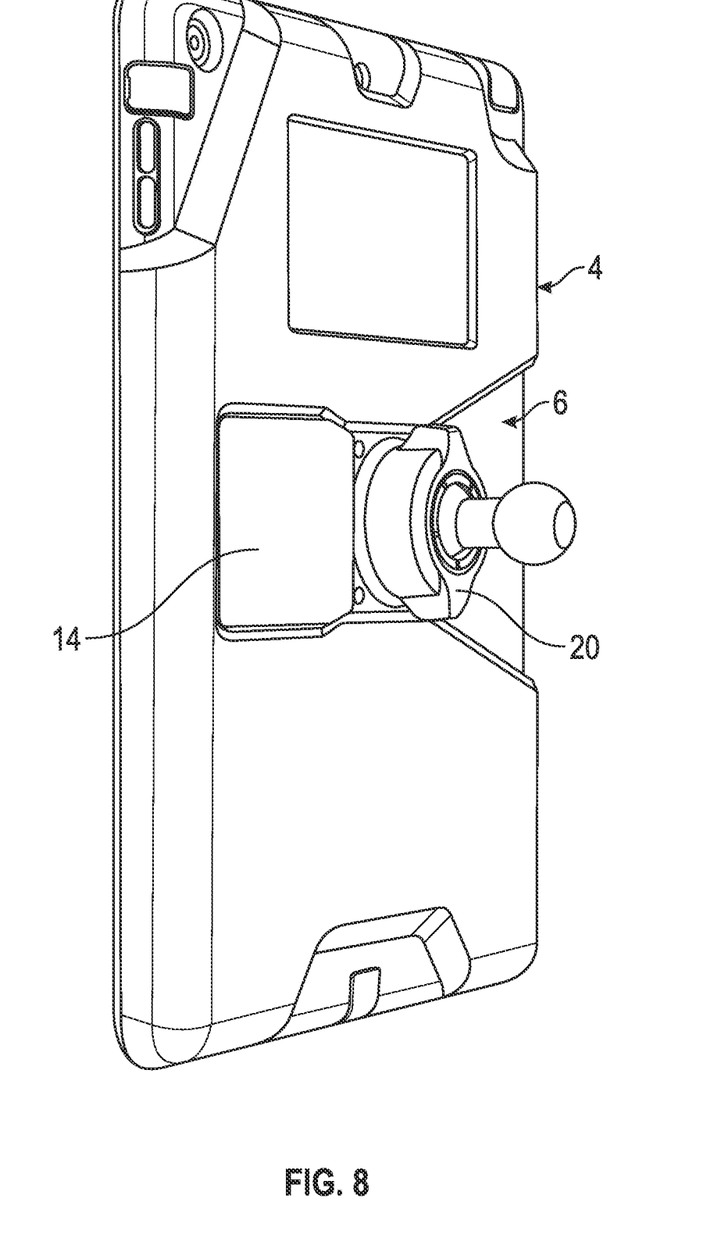
FIG. 8 is a perspective rear schematic view of the quick release support system with the mounting assembly engaged with the channel and the clasp.

FIG. 8 is a perspective rear schematic view of the quick release support system with the mounting assembly engaged with the channel and the clasp. The mounting assembly 20 can be releasably secured in the three orthogonal directions using the clasp 14 and the structure of the opening 8 of the channel 6.

Figure 9:
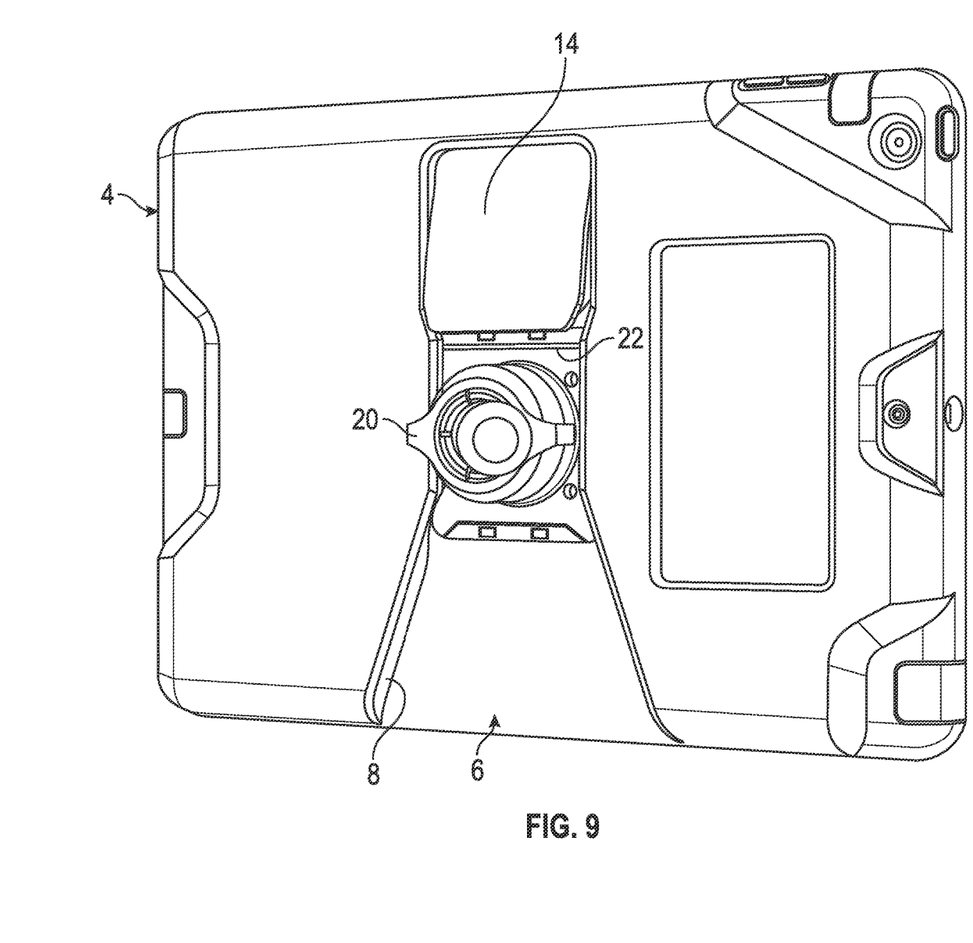
FIG. 9 is a perspective rear schematic view of the quick release support system with the mounting assembly released from the clasp.

FIG. 9 is a perspective rear schematic view of the quick release support system with the mounting assembly released from the clasp. To release the mounting assembly 20, the clasp can be moved away from the surface of the channel 6 to disengage the protuberance 16 of the clasp 14 from the protuberance 22 and/or openings 23 on the mounting assembly, described above. The mounting assembly 20 can then be slid out of the channel 6.

Figure 10:
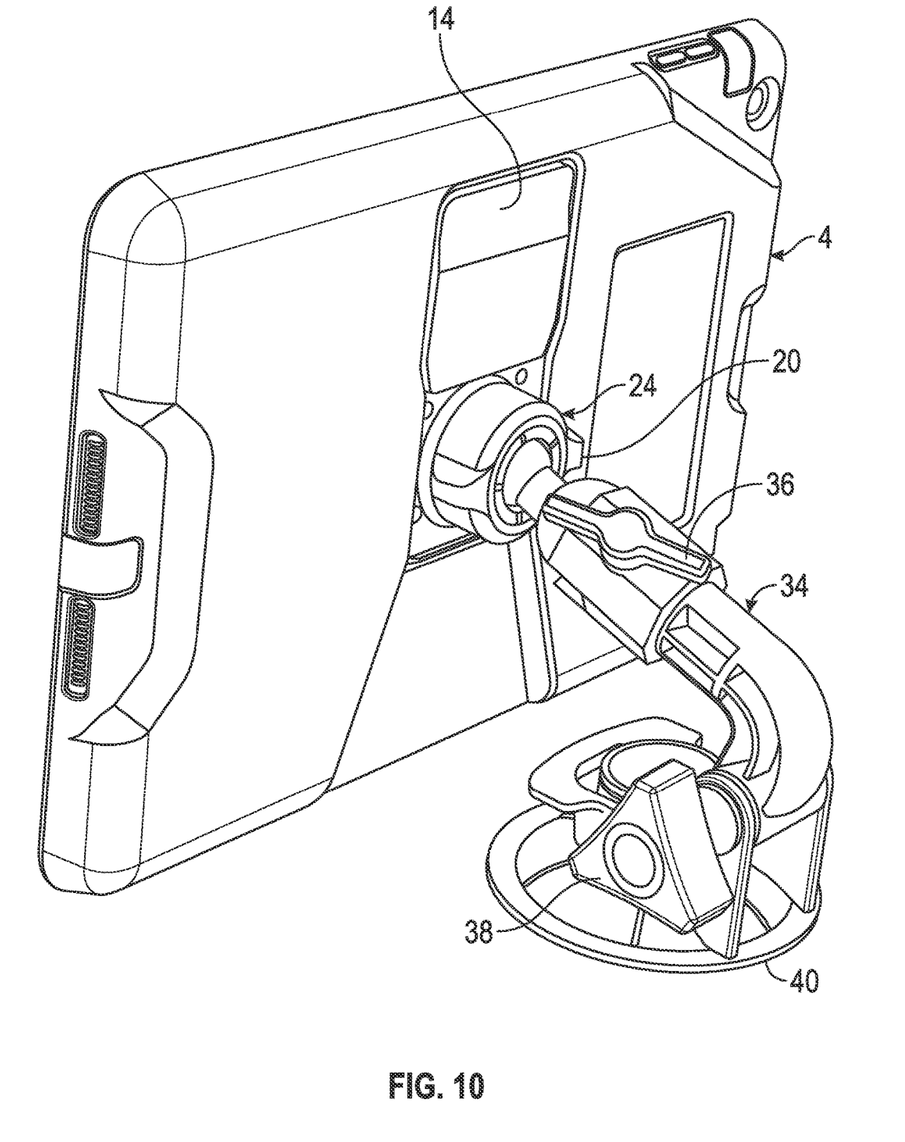
FIG. 10 is a perspective rear schematic view of the quick release support system coupled to a support for a surface.

FIG. 10 is a perspective rear schematic view of the quick release support system coupled to a support for a surface. The quick release support system 4 with the portable device can be coupled through the mounting assembly 20 to a support 34. The support 34 can have a variety of adjustments for angles, orientations, and heights of the device. One or more adjustors 38 can be selectively tightened and loosened to facilitate the adjustments. A base 40 can be supported and/or coupled to a surface, such as a cockpit surface, table, desk, or other stable structure.

FIG. 11 is a perspective rear schematic view of another exemplary embodiment of the quick release support system. FIG. 12 is a perspective rear schematic assembly view of the quick release support system of FIG. 11. This non-limiting illustrative embodiment is similar to the described embodiment above, except that the mounting plate 21 is round. Consequently, the clasp 14 can be shaped to correspond to the round mounting plate and protuberances on the clasp can be appropriately located to engage one or more openings 23 (and/or protuberances as described above) in the mounting plate 21.

Other and further embodiments utilizing one or more aspects of the invention described above can be devised without departing from the spirit of Applicant's invention. For example, the shape of the mounting assembly can vary as may be appropriate for a shape of the channel, the shape of the clasp can vary depending on the type of coupling structure for the mounting assembly, the shape of the system can vary depending on the portable device, whether the channel is integrally formed with the holder or attached as a separate structure thereto, and other variations as would be understood by a person with ordinary skill in the art, after being provided with the teachings herein.

Further, the various methods and embodiments of the quick release support system and support can be included in combination with each other to produce variations of the disclosed methods and embodiments. Discussion of singular elements can include plural elements and vice-versa. References to at least one item followed by a reference to the item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalent of the following claims.

What is claimed is:

1. A quick release support system for a holder of a portable device, comprising:

a channel configured to be coupled to the holder and defining a bottom channel surface;

a clasp rotatably coupled to the channel relative to the bottom channel surface, the clasp having a first portion being biased to a closed position toward the bottom channel surface and a second portion distal from the first portion that is biased to an open position away from the bottom channel surface with the first portion being biased to the closed position, the second portion being disposed closer to an edge of the holder than the first portion; and a mounting assembly comprising a mounting plate configured to slide along the channel over the bottom surface and be aligned with the clasp when the first portion is lifted away from the bottom channel surface in an open position and the second portion is pressed toward the bottom channel surface in a closed position and configured to engage with the clasp when the first portion is in a closed position and the second portion is in an open position, the channel having a variable width opening above the bottom channel surface that narrows in width and configured to progressively align laterally the mounting assembly across the variable width opening as the mounting assembly slides along the channel toward the clasp to constrain the mounting assembly in a first direction, wherein the variable width opening of the channel is sized to allow the mounting plate to be inserted into the variable width opening at a plurality of locations along the channel.

2. The system of claim 1, wherein the channel comprises an overarching wing and is configured to constrain the mounting assembly to the channel in a second direction away from the bottom channel surface.

3. The system of claim 2, wherein the clasp is configured to engage the mounting assembly and constrain the mounting assembly in a third direction.

4. The system of claim 1, wherein at least one of the mounting assembly and the clasp comprises at least one protuberance configured to secure the mounting assembly with the clasp.

5. The system of claim 1, further comprising a support coupled to the mounting assembly, the support being configured to be coupled to a structure for supporting the holder.

6. The system of claim 1, wherein the mounting plate comprises at least one of a rectangular mounting plate or a round mounting plate.

7. The system of claim 1, further comprising the holder, wherein the channel is integrally formed in the holder.

8. The system of claim 1, wherein at least one of the mounting assembly and the clasp comprises at least one protuberance configured to secure the mounting assembly with the clasp.

9. The system of claim 8, wherein the clasp is configured to be manually rotated to cause the at least one protuberance to release the mounting assembly.

10. The system of claim 1, wherein the mounting assembly is configured to be progressively aligned along any peripheral surface of the mounting assembly in the variable width opening of the channel toward the clasp to constrain the mounting assembly.

11. The system of claim 1, wherein the channel is configured to continuously progressively align laterally the mounting assembly.

12. The system of claim 11, wherein the channel is configured to continuously progressively align laterally the mounting assembly across the variable width opening from at one end of the channel as the mounting assembly slides along the channel.

13. The system of claim 1, wherein the mounting plate is shorter in length than the channel.

14. A method of coupling a holder of a portable device with a quick release support system, the quick release support system including:

a channel configured to be coupled to the holder and defining a bottom channel surface, wherein the channel has a variable width opening above the bottom channel surface that narrows in width;

a clasp rotatably coupled to the channel relative to the bottom channel surface, the clasp having a first portion being biased to a closed position toward the bottom channel surface and a second portion distal from the first portion that is biased to an open position away from the bottom channel surface with the first portion being biased to the closed position, the second portion being disposed closer to an edge of the holder than the first portion; and a mounting assembly comprises a mounting plate configured to slide along the channel over the bottom surface and be aligned with the clasp when the first portion is lifted away from the bottom channel surface in an open position and the second portion is pressed toward the bottom channel surface in a closed position and configured to engage with the clasp when the first portion is in a closed position and the second portion is in an open position, wherein the variable width opening of the channel is sized to allow the mounting plate to be inserted into the variable width opening at multiple locations along the channel, the method comprising:

initially aligning the mounting assembly with the channel and inserting the mounting assembly into the variable width opening at least at one of the plurality of locations;

sliding the mounting assembly along the channel;

progressively aligning laterally the mounting assembly across the variable width opening of the channel as the mounting assembly becomes proximate in the channel to the clasp and constraining the mounting assembly in a first direction;

moving the clasp away from a surface of the channel and allowing clearance for the mounting assembly by pressing the second portion toward to the bottom channel surface to lift the first portion away from the channel surface;

moving the clasp into engagement with the mounting assembly.

15. The method of claim 14, wherein the channel comprises an overarching wing and further comprising constraining the mounting assembly to the channel in a second direction away from the bottom channel surface.

16. The method of claim 15, further comprising constraining the mounting assembly with the clasp in a third direction.

17. The method of claim 14, further comprising coupling the mounting assembly to a support, and releasably engaging and disengaging the holder from the mounting assembly.

18. The method of claim 14, wherein progressively aligning laterally the mounting assembly comprises continuously progressively aligning laterally the mounting assembly.

19. A quick release support system for a holder of a portable device, comprising:

a channel configured to be coupled to the holder and defining a bottom channel surface;

a clasp rotatably coupled to the channel relative to the bottom channel surface, the clasp having a first portion being biased to a closed position toward the bottom channel surface and a second portion distal from the first portion that is biased to an open position away from the bottom channel surface with the first portion being biased to the closed position, the second portion being disposed closer to an edge of the holder than the first portion; and a mounting assembly comprising a mounting plate configured to slide along the channel over the bottom surface and be aligned with the clasp when the first portion is lifted away from the bottom channel surface in an open position and the second portion is pressed toward the bottom channel surface in a closed position and configured to engage with the clasp when the first portion is in a closed position and the second portion is in an open position, the channel having a variable width opening above the bottom channel surface that narrows in width and configured to progressively align laterally the mounting assembly across the variable width opening as the mounting assembly slides along the channel toward the clasp to constrain the mounting assembly in a first direction, and wherein at least one of the mounting assembly and the clasp comprises at least one protuberance configured to secure the mounting assembly with the clasp;

wherein the second portion being disposed closer to an edge of the holder than the first portion is configured to allow an user to grasp the holder by hand along the edge and with the same hand depress the second portion of the clasp toward a closed position to lift the first portion to an open position to release the mounting assembly from the holder, wherein the variable width opening of the channel is sized allow the mounting plate to be inserted into the variable width opening at a plurality of locations along the channel.

20. The system of claim 19, wherein the channel is configured to continuously progressively align laterally the mounting assembly.

21. The system of claim 20, wherein the channel is configured to continuously progressively align laterally the mounting assembly across the variable width opening from at one end of the channel as the mounting assembly slides along the channel.

* * * * *